Aug. 10, 1965 G. M. P. VIEILLARD 3,200,239
MANUAL AND RECORD OPERATED ACCOUNTING MACHINE
Filed May 11, 1960 3 Sheets-Sheet 2

3,200,239
MANUAL AND RECORD OPERATED
ACCOUNTING MACHINE
Georges Maxime Pierre Vieillard, Paris, France, assignor to Machines Automatiques Modernes (Societe a Responsabilite Limitee), Paris, France
Filed May 11, 1960, Ser. No. 28,365
Claims priority, application France, Sept. 16, 1954, 672,290, Patent 1,114,901
5 Claims. (Cl. 235—61.9)

This application is a continuation-in-part application of my earlier application Serial No. 534,117 filed September 13, 1955 and now abandoned.

This invention relates to improvements in accounting machines and to improve techniques of operation for such machines.

It is known that in accounting machines comprising totalizers in which account or record sheets are employed, one of the operations which may most easily lead to errors is the "taking up" or "carrying forward" of the cumulative balance or of any information already recorded on a sheet in the course of the preceding operation, which aforesaid operation must be carried out before the recording of a new entry and the new consecutive totalization.

In order to avoid errors on the part of the operator in such cases, it has already been proposed to duplicate the visible entry of the balance recorded on the account sheet by means of a corresponding invisible magnetic recording which serves during a subsequent accounting operation to automatically bring the parts of the machine into the calculating or entering position corresponding to the balance appearing in visible writing. The operator is then relieved of the necessity of making the entry of the old balance into the machine manually when handling each account sheet. Consequently, many errors are avoided.

According to one of the methods already proposed, the last visible entry recorded on an account sheet is duplicated by means of a corresponding invisible magnetic recording made on a metal tab which can be detachably secured to the account sheet. Before making new entries on a particular sheet the operator unclips from said sheet the tag which retains the last balance magnetically recorded in code form therein, the tag is thereupon inserted in a so-called "old balance slot" of the bookkeeping machine. Upon impression of a start button the coded information on the tag is automatically set up in the proper register of the machine. An erase button is manipulated, whereupon the old balance is removed from the tag. The tag is then removed from the "old balance slot" and inserted into a "new balance slot". When the machine has computed the new balance of the current transaction such new balance is recorded in code on the tag which is then removed from the slot. When finally the account sheet is removed from the machine, the tag is clamped thereto for future use.

It is clear that the manipulations involved in such method are uneasy and lead to errors and waste of time.

According to another known method, the last visible balance recorded on an account sheet is duplicated by means of a corresponding invisible magnetic recording made on a predetermined area of the same sheet, said sheet being provided at least in said area with magnetizable material. According to the above method, this account sheet is inserted at one end of the sheet feeding path of the posting machine and is ejected at the other end of said path, and, as said sheet is fed along said path, said predetermined area of the sheet at first passes under a set of reading magnets so that the magnetic recording is read thereby to effect entry of the last balance in one accumulator of the machine; the sheet is then halted at the printing position. After a new balance has been set up in the machine and printed on the sheet, the sheet feeding operation is resumed so that the sheet travels in the same direction as before the printing operation. The said predetermined area of the sheet then passes under a set of recording magnets which are energized in such a manner as to record the new balance on said predetermined area.

According to this method the sheets are ejected from the machine in a position which is different from the position in which it is inserted in the machine and this is a disadvantage in several applications. Moreover in the latter method as well as in the former, two sets of magnets are necessary, one for the reading operation, the other for the recording operation.

It is therefore an object of the invention to overcome the disadvantages of the known methods of carrying out the operation referred to.

The invention provides a new, simple and useful method of transferring information from a card or sheet to a machine and vice versa.

According to said method, information which has been printed on an account sheet and magnetically recorded on a place of said sheet provided with magnetizable material is read out by a magnetic head so as to be transferred into the accounting machine while said account sheet travels in a first direction along a feeding path of the machine, and information which has been subsequently set up in the machine and printed on said sheet is magnetically recorded by the same magnetic head on the said place of the sheet while said sheet travels along said feeding path in a direction opposite to said first direction.

The invention may be applied, not only to the preparation of account cards or sheets, but also to the preparation of any document in which a prior entry, for example of figures, letters or coded signs, must be registered in a machine before new entries are proceeded with.

An account document or the like, according to the invention, is provided with magnetic recording media completely or partly covering the document, for example in bands or areas for recording in lines or in columns "magnetic signals" which represent in code the characters to be taken up, the said bands being parallel to the direction of movement of the document in the machine.

An accounting machine according to the invention comprises a feeding path, means for feeding an account document, in either one of two opposite directions along said path and a magnetic reading and recording means which, during the introduction of said document in a first one of said directions in the machine, can read data magnetically recorded on a part provided with magnetic storage medium on said document and which, during the delivery of the document in the second one of said directions can record new data magnetically on the same part of said document.

Thus, the mere introduction of the account document in the accounting machine, as in normal bookkeeping practice, causes the magnetic storage part of the document to travel past a magnetic head of a reading and recording means, and to control the carrying forward of the data carried by said document. The mere delivery movement of the account document out of the accounting machine causes similarly the same magnetic storage part of the document to travel past the same magnetic head of the reading and recording means which then effects the magnetic recording of new data on said storage part of the document.

The accounting machine comprises a magnetic reading and recording device having electric imput and output circuits linked to appropriate means for placing some parts of the machine under control of said device and conversely.

An object of the invention therefore is to provide an accounting machine having a document feeding path with means for advancing an account document along said path in either one of two opposite directions and with means adapted to read magnetically recorded data on an account document while the same is advanced in the first one of said directions along said feeding path and to record data magnetically on an account document while the same is advanced in the second one of said directions along said feeding path.

For a better understanding of the invention and to show how it may be carried into effect, the same will now be described, by way of example, with reference to the accompanying drawings wherein.

The method according to the invention can be carried out by any accounting machine which is or can be provided wth a sheet feeding path and means for advancing accounting sheet in either one of two opposite directions along said path and which moreover can be provided with a magnetic head, or a set of magnetic heads, suitably disposed with respect to the sheet feeding path so as to effect either reading or recording of data on a predetermined area of the account sheet while said area travels past a reference position along said path. It can be applied to mechanical machines of the kind described in U.S. Patent No. 1,197,276 as well as to electrical machines known in the art as exemplified in U.S. Patent No. 2,412,537.

Figure 1:
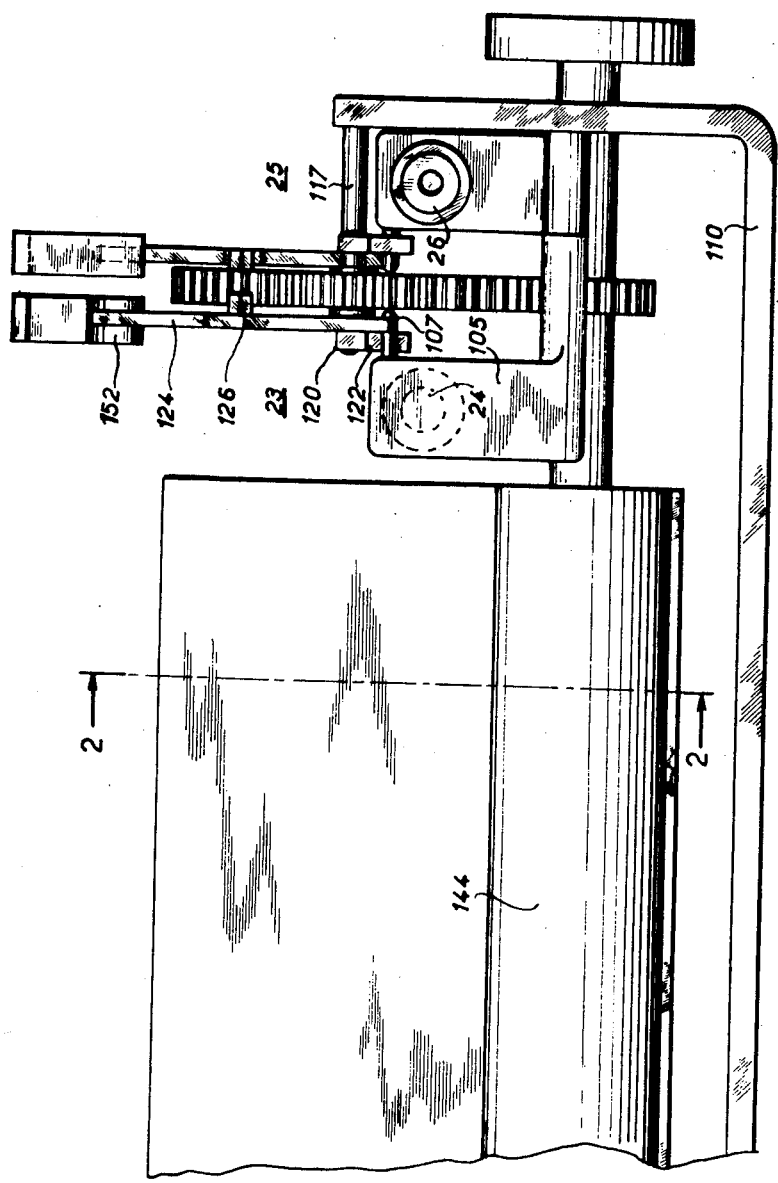
FIG. 1 is a plan view of a part of a bookkeeping machine.
Figure 2:
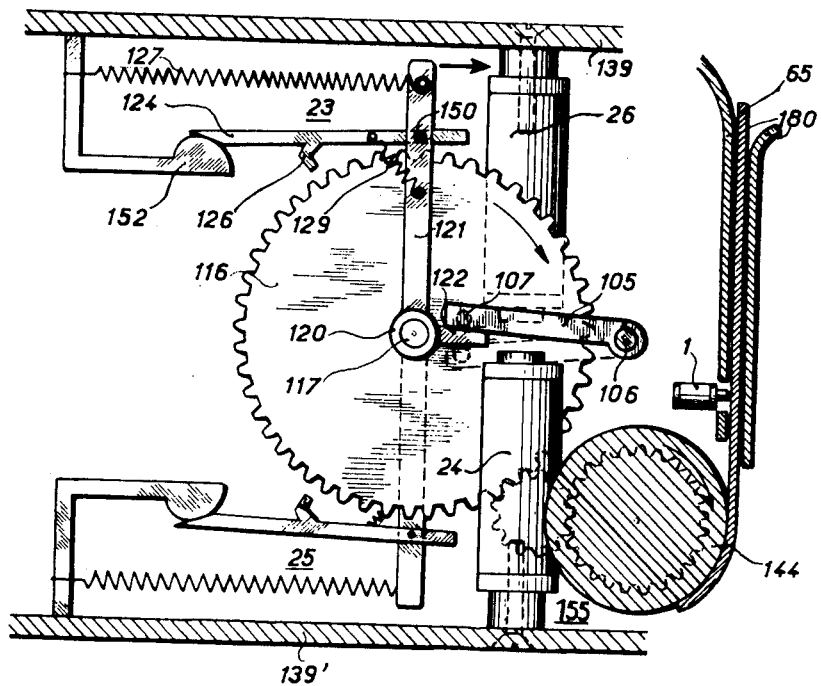
FIG. 2 is a vertical section taken along the line 2—2 of FIGURE 1.

Any of these machines can be provided with an attachment of the kind described in U.S. Patent No. 1,985,178 or at least by the part of said attachment shown on FIGURES 1 and 2 of the present application.

This attachment, generally designated by the numeral 23 (FIGURES 1 and 2), comprises a gear 116 loosely mounted upon a shaft 117 extending from a frame 110 (FIGURE 1) of the machine, lever 120 (FIGURE 2) loosely mounted on shaft 117 and having a long arm 121 and a short arm 122, arm 124 pivotally connected to the arm 121, as shown at 150, pawl 126, cam member 152 fixed to a part 139 of a frame of the machine, spring 127 and 129.

This mechanism 23 is adapted to rotate the platen 144 of a book-keeping machine so that, for instance, the sheet 65 fed around the platen 144 is advanced one line interval each time it is actuated.

Automatic means are provided for actuating said mechanism 23. This automatic actuating means comprises a magnet 24 which is adapted to rock lever 120. The magnet is mounted on a part 139' of a frame of the machine. Cooperating with the magnet 24 is an armature lever 105 pivoted on a stud 106 extending from a frame 110 (FIG. 1) of the machine. Projecting from the side of armature 105 is a pin 107 which is long enough to pass the side of short arm 122 of lever 120.

When magnet 24 is energized, armature 105 is rocked in a counterclockwise direction (FIGURE 2) and pin 107 thereon pushes short arm 122. As a result, long arm 121 is moved to the right as shown in FIGURE 2 and as indicated by the arrow. When pawl 126 engages the teeth of gear 116 further movement of arm 121 will cause rotation of gear 116 in a clockwise direction (FIGURE 2) and likewise the platen 144 due to the meshing of gear 116 with gearing means 155. The sheet 65 is thus advanced one line interval downwardly.

It will be seen that, through this construction, the sheets are introduced in the machine line by line in a downward manner over the front portion of the platen 144.

A mechanism generally designated by the numeral 25 is associated with gear 116 as shown on FIGURES 1 and 2. This mechanism 25 is similar to the one 23 which has just been described. It is actuated by automatic actuating means which is similar to the one provided for actuating mechanism 23. This automatic actuating means comprises a magnet 26.

When magnet 26 is energized, this mechanism 25 causes rotation of platen 144 in a counterclockwise direction. The sheet 65 is thus ejected in an upward manner from the front portion of the platen 144.

The account machine for carrying into effect the method according to the invention is thus provided with means for advancing an account sheet in either one of two opposite directions along a sheet feeding path. Said feeding path is shown partially in FIGURE 2 by two suitable sheet guides 180 situated above the platen 144.

Referring to FIGURE 2, a magnetic read-write head 1 of known kind is shown to be situated above the platen 144 and so disposed with respect to the sheet guides 180 that the pole pieces thereof are in close proximity to an account sheet inserted between the guides.

Figure 3:
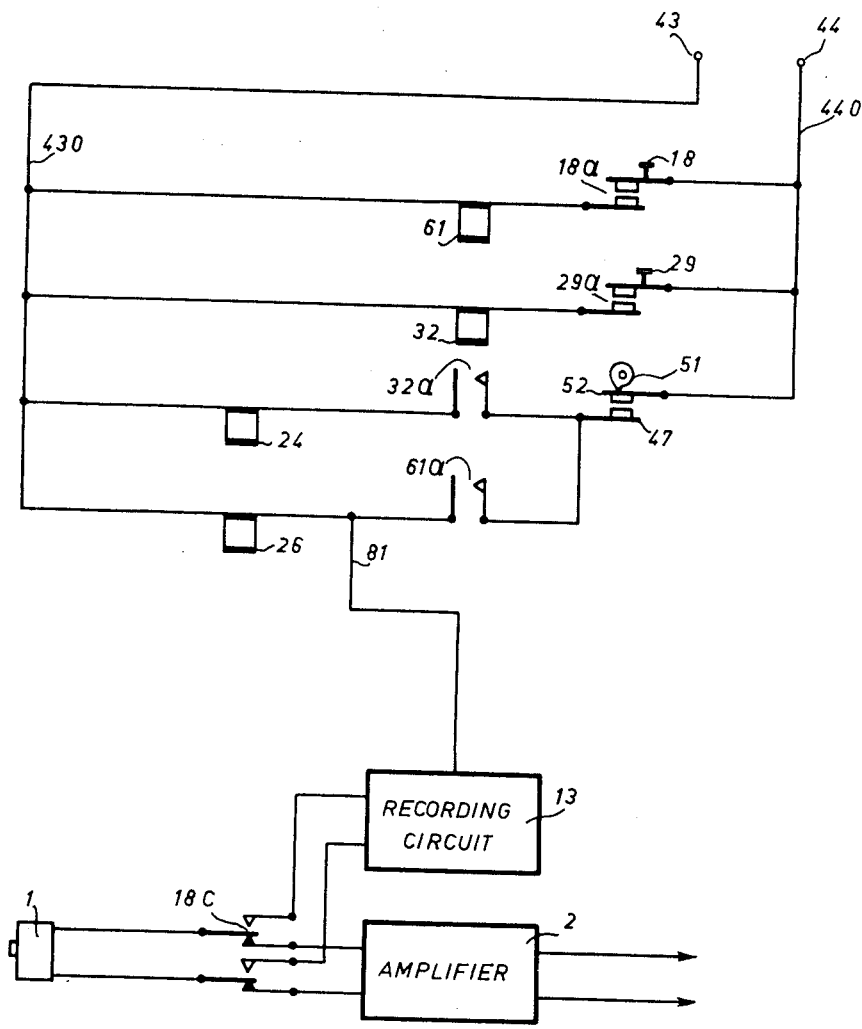
FIG. 3 shows schematically a circuit for operating the machine according to the invention.

As shown on FIGURE 3, said magnetic head 1 is connected through normally closed contacts 18c to a usual well known type of electronic amplifier indicated by the reference numeral 2 and constituting read-out circuit means. When contacts 18c are transferred, the magnetic head 1 is connected to a recording circuit 13 of a usual known type.

Several methods and means for the magnetic reading and recording of data are well known in the art as exemplified in the U.S. Patents No. 2,254,931 and 2,357,456, and since specific features of such methods and means form no part of the present invention, a detailed description thereof is not necessary.

An electric circuit which permits the operating of the machine according to the invention is shown on FIGURE 3 and comprises two main lines 430 and 440 connected to a source of current through terminals 43 and 44 respectively. Said circuit further comprises a rotating cam 51 which causes contact 47 to be periodically closed. Said contact 47 periodically supplies current to various parts of the circuit so that electrical pulses are carried to said parts as explained hereafter.

As already explained the account sheet 65 which is to be used when carrying out the invention, is adapted to magnetically store information, such as an old or a new balance and may be of the well known types such as those exemplified in U.S. Patent No. 2,254,931 and No. 2,357,456. A suitable account sheet can comprise a paper carrier or base which is coated with magnetizable material. Alternately magnetic lines can be obtained either in the mass of the account sheet or only on the surface thereof.

The assembly operates as follows: the account sheet is inserted between guides 180 at the top of the feeding path, with the section carrying the magnetically recorded data properly positioned with respect to the magnetic head. The introduction button 29 (FIGURE 3) is then depressed until a desired line of the card is in printing position.

Depression of button 29 causes the electromagnet 32 to be energized by the circuit: line 440, contacts 29a closed, electromagnet 32, line 430. The contact 32a is closed and pulses are sent to electromagnet 24 by the circuit: line 440, contact 47 periodically closed, contact 32a closed, electromagnet 24, line 430. Therefore, as previously stated, when pulses feed electromagnet 24 the account sheet is lowered line by line and the operator releases button 25 when a desired line of the card has reached printing position on the platen 144. During the movement of introduction of the sheet, the magnetically record data are sensed by magnetic head 1 which is then connected through normally closed contacts 18c to the input of amplifier 2, the output of which controls, if desired, proper register of the machine so that the old balance will be automatically set up therein.

When the account machine has been operated and for instance has computed a new balance, the operator depresses the ejection button 18 (FIGURE 3) which closes contact 18a and transfers contacts 18c. Electrical current feeds the electromagnet 61 by the circuit: line 440, contact 18a closed, electromagnet 61, line 430. The contact 61a is closed and pulses are sent to electromagnet 26 by the circuit: line 440, contact 47 periodically closed, contact 61a closed, electromagnet 26, line 430. The periodic energization of electromagnet 26 causes the account sheet to be raised line by line and the operator releases button 18 when the sheet has reached a position where it can be withdrawn manually.

During the movement of ejection of the sheet, the section thereof which is adapted to record data magnetically travels past the magnetic head 1 which is then connected through transferred contacts 18c to the output of a recording circuit 13 which can operate in synchronism with pulses supplied thereto by the circuit: line 440, contact 47 periodically closed, contact 61a closed, connection 81. This recording circuit 13, for instance, can be adapted to operate in connection with the read-out device of an accumulator of the machine, in order to control the magnetic head to record a new balance on the sheet.

I claim:

1. In an accounting machine, the combination of a sheet advancing path, means for advancing a sheet in either one of two opposite directions along said path, means located along said path for either reading or writing magnetic recordings on a sheet advanced along said path, means for controlling said advancing means for advancing a sheet in a predetermined one of said directions, and means associated with said controlling means for controlling said reading and writing means for writing while said controlling means controls said advancing means for advancing a sheet in said predetermined direction.

2. A method for transferring information between a sheet having a zone provided with magnetizable material for magnetically storing information, and a machine having a sheet feeding path and magnetic reading and recording means, said method comprising the steps of feeding said sheet in a first direction along said feeding path and simultaneously reading information from said zone of said sheet, and feeding said sheet along said path in a direction opposite to said first direction and simultaneously recording information on said zone of said sheet.

3. An accounting machine comprising first engageable means for stepwise advancing a sheet having a zone of magnetizable material along a sheet advancement path for injection into said machine, second engageable means for stepwise ejecting the sheet back along the advancement path towards the original position thereof, a single read-write head operatively positioned with respect to the path of travel of the sheet for recording and for reproducing information in the magnetizable zone of the sheet, recording circuit means adapted for being coupled with the head to perform a recording operation on the sheet, read-out circuit means adapted for being coupled with the head, means for selectively coupling the read-write head with the recording circuit means and the read-out circuit means, means associating the last said means with both the engageable means to couple the read-write head with the read-out circuit means when the first engageable means is engaged and the sheet is being injected into the machine and to couple the read-write head with the recording circuit means when the second engageable means is engaged and the sheet is being ejected from the machine, said sheet being advanced stepwise during injection and ejection of the sheet between successive distinct positions whereat information may be located, the machine further comprising means associated with the recording circuit means and the second engageable means for restricting recording of information onto the sheet only at the said distinct positions on the sheet.

4. In an accounting machine, the combination comprising: selectively operable means for displacing a sheet having a magnetizable zone in either one of two opposite directions, selectively settable means operatively positioned with respect to the path of the sheet for reading and for writing information magnetically in the magnetizable zone on a sheet displaced by said displacing means, means for selectively operating said displacing means for displacing a sheet in one or in the other of said directions, means for selectively setting up said reading and writing means for reading or for writing, and means associating said selective setting means with said selective operating means to set up said reading and writing means for writing while said displacing means displaces a sheet in a predetermined one of said directions.

5. In an accounting machine, the combination of controllable means for advancing a sheet having a zone of magnetizable material along a sheet advancement path in two opposite directions along said path, means operatively positioned with respect to said path for recording and for reproducing information in the magnetizable zone of the sheet, means for selectively controlling said advancing means to operate the latter for advancing a sheet in one or in the other of said opposite directions, means for selectively controlling said recording and reproducing means to operate the latter for recording or for reproducing, and means associating the last said controlling means to the first said controlling means to operate the recording and reproducing means for reproducing during advancing of the sheet in a predetermined one of said opposite directions and for recording during advancing of a sheet in the other one of said opposite directions.

References Cited by the Examiner

UNITED STATES PATENTS

| | | | |
|---|---|---|---|
| 2,357,455 | 9/44 | Bryce | 235—61.9 |
| 2,972,736 | 2/61 | Hersh | 346—74 |
| 3,034,712 | 5/62 | Mead | 235—61.12 |

MALCOLM A. MORRISON, *Primary Examiner.*

WALTER W. BURNS, JR., DARYL W. COOK,
*Examiners.*